W. E. COPITHORN.
VALVE.
APPLICATION FILED FEB. 1, 1915.
1,159,475.
Patented Nov. 9, 1915.
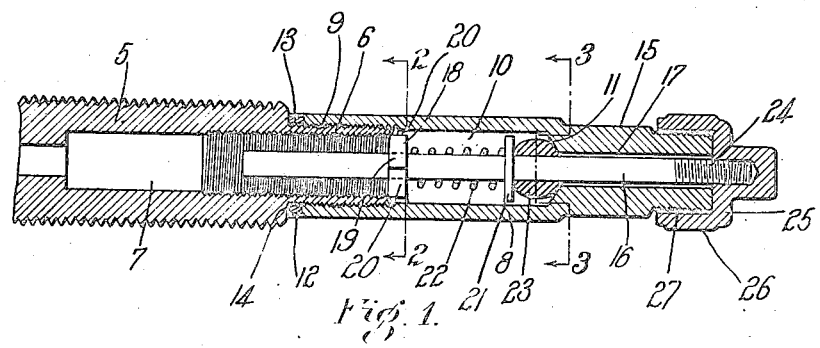
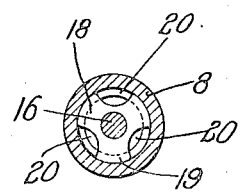
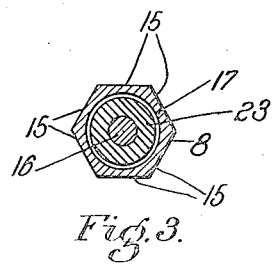
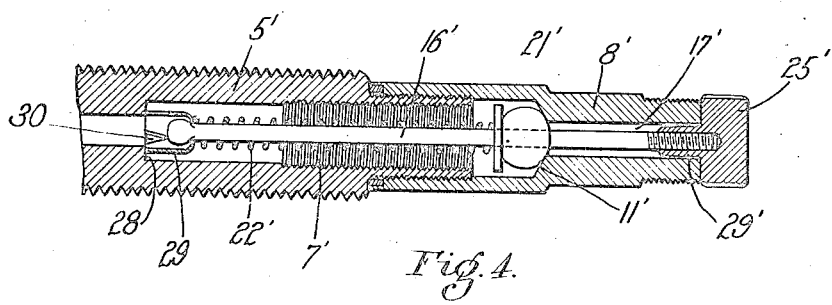
Witnesses:
Leonard A. Powell
Herman R. Hoffman
Inventor:
Walter E. Copithorn
By his attorney

UNITED STATES PATENT OFFICE.

WALTER E. COPITHORN, OF NATICK, MASSACHUSETTS.

VALVE.

1,159,475. Specification of Letters Patent. Patented Nov. 9, 1915.

Application filed February 1, 1915. Serial No. 5,468.

*To all whom it may concern:*

Be it known that I, WALTER E. COPITHORN, a citizen of the United States, residing at Natick, in the county of Middlesex and State of Massachusetts, have invented new and useful Improvements in Valves, of which the following is a specification.

This invention relates to improvements in valves and more particularly to valves adapted for use in connection with pneumatic tires. In this type of valves means are provided which permit the attachment thereto of a tube or pipe from an air pump and as the air is forced from the pump through said valve, said valve will be automatically opened by a predetermined pressure of said air, permitting said air to enter the tire and as the pressure of the air from said pump decreases, said valve will be automatically closed. In most of the valves of this nature dependence is placed upon the pressure of the air within the tire together with the assistance of a spring to return the valve to a position against its seat and to prevent the escape of air from said tire. A cap is usually secured to the end of the valve tube merely to prevent dirt and dust from becoming lodged therein. Much annoyance is experienced from these valves, due to the small particles of dust and dirt becoming lodged between the valve and its seat which prevents a complete closing of the same and thus permits the air to escape from the tire.

The object of the present invention is to eliminate the difficulties and objections above recited by providing a simple and inexpensive valve which may be automatically opened by the injection of air into the tire during the inflation thereof, but with provision for positively closing said valve after the desired pressure of air therein has been reached and thus insure the maintenance of such a pressure during the operations and movements of the vehicle.

A further object of the invention is to provide a valve of the above nature embodied in a supplementary valve tube which may be quickly and easily attached to the valve tubes of other types while the same are in place upon the vehicle and in place of the above mentioned cap.

The invention consists in the combination and arrangement of parts set forth in the following specification and particularly pointed out in the claim.

Referring to the drawings: Figure 1 is an enlarged longitudinal section, partly in elevation, of a tire valve embodying my invention. Fig. 2 is a transverse section, partly in elevation, taken on line 2—2 of Fig. 1. Fig. 3 is a transverse section taken on line 3—3 of Fig. 1. Fig. 4 is an enlarged longitudinal section, partly in elevation, of a modified form of valve.

Like numerals refer to like parts throughout the several views of the drawings.

In the drawings, 5 is the valve tube of one of the most common type of tire valve having screw-threads 6 formed at the outer end thereof for connection with an air pump, and a hole 7 extending longitudinally thereof. A supplementary valve tube 8 is attached to the outer end of the valve tube 5 preferably by screw-threads 9 engaging the threads 6 of said tube.

The supplementary valve tube 8 is recessed at 10 for a considerable portion of its length, which recess extends from the thread or inner end of said tube toward the outer end thereof and terminates at an internal annular shoulder 11, said shoulder constituting the valve seat.

The inner end of the tube 8 is counterbored at 12 and contains a washer 13 of relatively soft material, preferably lead, which is seated against a shoulder 14 on the tube 5 and assists in sealing the joint between the tube 5 and the supplementary tube 8 to prevent the air from leaking therethrough. The outer end of the tube 8, preferably surrounding the portion 10 in the shoulder 11, is flattened as at 15 to receive a wrench whereby the same may be screwed firmly to the end of the tube 5.

A valve rod 16 is arranged within the supplementary tube 8 to reciprocate longitudinally of said tube in bearings 17 and 18, said bearing 17 being formed in the end of said supplementary tube outside of the shoulder 11, while the bearing 18 is formed in a disk 19 placed against the end of the tube 5. Said disk has passages 20 extending therethrough to permit the air to pass freely from the tube 8 into the tube 5.

A collar 21 is attached in any suitable manner to the rod 16 and constitutes a seat for one end of a helical spring 22 which surrounds said rod between said collar and the disk 19 and yieldingly forces said rod toward the outer end of said supplementary tube 8.

A washer 23, preferably spherical and constructed of suitable resilient material such as rubber, or if desired lead may be used, is mounted upon the rod 16 against the collar 21 and upon the opposite side of said collar from the spring 22, said washer constituting the valve which engages the shoulder or seat 11 of said supplementary casing and is yieldingly retained in contact with said shoulder by means of said spring.
The outer end of the rod 16 projects slightly beyond the outer end of the casing or supplementary tube 8 and constitutes a tickler whereby said valve may be opened in case it has become stuck. The projecting end of said rod is screw-threaded at 24.

A cap 25 has screw-threaded engagement with the threaded end of the rod 16, said cap having a knurled barrel 26 surrounding the end of said supplementary tube 8 and by means of which said cap may be turned to draw said rod 16 outwardly and thus positively cause said valve or washer 23 to engage the seat 11.

To inflate the tire to which the tube 5 is attached the cap 25 is removed from the rod 16 and the usual pump tube is attached to the end of the supplementary casing by means of the threads 27. The pressure of the air from the pump causes the valve 23 to move away from the seat 11 and thus compress the spring 22, said air passing through said supplementary tube through the passages 20 and the hole 7 in said tube 5 into the tire. Upon the reduction of the air pressure from the pump, the spring 22 causes said valve to return to its position against the seat 11 and thus prevent, in the usual manner, the escape of the air from the tire.

When sufficient air has been pumped into the tire, the pump tube is disconnected from the valve tube 8 and the cap 25 screwed to the valve rod 16 against the end of the tube 8 causing the collar 21 to compress the washer 23 against the seat 11, positively closing the valve and preventing any air from escaping therefrom.

In the construction illustrated in Fig. 1, the valve mechanism of the valve tube 5 must first be removed before the supplementary tube with its valve can be attached thereto as the valve rod 16 projects into the hole 7 in said valve tube, which is prepared to contain said valve mechanism.

In the form illustrated in Fig. 4 the tube 5' is identical with the tube 5 illustrated in Fig. 1. The supplementary tube 8' however of this form of valve is made much shorter than the tube 8, consequently there is not as much room for the spring and said supplementary tube does not project as far from the end of the tube 5' as in the first case. This construction necessitates the extension of the valve rod 16' into the tube 5' to a greater extent and consequently the inner guide for said valve rod instead of being at the outer end of the tube 5' has been placed against a shoulder 28, which was utilized by the old valve mechanism of the tube 5'.

The bearing for the inner end of said rod 16' is preferably a cup-shaped washer 29 having passages 30 therein adapted to permit the air to pass from the hole 7' through to the tire. A spring 22' encircles the rod 16' engaging said cup-shaped washer 29 and a collar 21' secured to said rod, similar to the collar 21 as shown in Fig. 1, said spring being adapted to force said collar 21' toward the outer end of the tube 8' and coincidentally compresses a resilient washer 23' against the seat 11' formed in the tube 8'.
The outer end of the rod 16' is threaded as in Fig. 1 and to said end is secured a cap 25' having an extension 29' which projects into a hole 17' in the shouldered portion of the tube 8'.

The operation of the valve in the form shown in Fig. 4 is similar to that of the valve illustrated in Fig. 1.

Having thus described my invention what I claim and desire by Letters Patent to secure is:

In combination a valve tube having a male threaded end, a supplementary metal tube secured to the male threaded portion of said valve tube, said supplementary tube having a conical valve seat formed within and integral therewith and adjacent to the outer end of said supplementary tube, a valve formed of relatively softer metal than that composing said seat, a valve rod for said valve, a spring encircling said rod and adapted to yieldingly retain said valve against said seat, and a cap for said supplementary tube having screw-threaded engagement with said rod and adapted to be operated to positively draw said valve against said seat.

In testimony whereof I have hereunto set my hand in presence of two subscribing witnesses.

WALTER E. COPITHORN.

Witnesses:
 CHARLES S. GOODING,
 SYDNEY E. TAFT.